(12) United States Patent
McGlaughlin

(10) Patent No.: US 9,071,558 B1
(45) Date of Patent: *Jun. 30, 2015

(54) METHOD AND SYSTEM FOR EXTENDED PORT ADDRESSING

(71) Applicant: QLOGIC, Corporation, Aliso Viejo, CA (US)

(72) Inventor: Edward C. McGlaughlin, Minneapolis, MN (US)

(73) Assignee: QLOGIC Corporation, Aliso Viejo, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 13/711,380

(22) Filed: Dec. 11, 2012

Related U.S. Application Data

(63) Continuation of application No. 12/731,065, filed on Mar. 24, 2010, now Pat. No. 8,351,448.

(60) Provisional application No. 61/162,960, filed on Mar. 24, 2009.

(51) Int. Cl.
  *H04L 12/28* (2006.01)
  *H04L 12/741* (2013.01)
  *H04J 1/16* (2006.01)

(52) U.S. Cl.
  CPC ................ *H04L 45/745* (2013.01)

(58) Field of Classification Search
  USPC .................. 370/252, 369, 419, 389, 463
  See application file for complete search history.

(56) References Cited

U.S. PATENT DOCUMENTS

| | | | |
|---|---|---|---|
| 7,623,519 B2 * | 11/2009 | Tornetta et al. | 370/392 |
| 2004/0252722 A1 * | 12/2004 | Wybenga et al. | 370/474 |
| 2006/0203725 A1 * | 9/2006 | Paul et al. | 370/229 |
| 2009/0141657 A1 | 6/2009 | Dutt et al. | |
| 2009/0168776 A1 | 7/2009 | Baum et al. | |
| 2010/0085981 A1 | 4/2010 | Gupta et al. | |
| 2011/0090816 A1 | 4/2011 | Dutt et al. | |
| 2011/0255534 A1 | 10/2011 | Yano et al. | |

OTHER PUBLICATIONS

"Office Action from USPTO dated Mar. 27, 2012 for U.S. Appl. No. 12/731,065".

* cited by examiner

*Primary Examiner* — John Pezzlo
(74) *Attorney, Agent, or Firm* — Klein, O'Neill & Singh, LLP

(57) ABSTRACT

Methods and systems for routing frames are provided. A system includes an initiator operationally coupled to a first switch that is coupled to a second switch. The first switch includes a plurality of ports for sending and receiving frames and includes a routing table that identifies a port identifier steering table based on an area field of a frame header of a frame received by the first switch. The first switch also includes a plurality of port identifier tables, where each port identifier table is associated with a unique area field and identifies a same port of the first switch for a plurality of area fields. The second switch stores an area steering table with port identification information associated with an area field of a frame header of a frame received by the second switch and a same port of the second switch is assigned to multiple area fields.

15 Claims, 10 Drawing Sheets

METHOD AND SYSTEM FOR EXTENDED PORT ADDRESSING

CROSS-REFERENCE TO RELATED APPLICATION

This patent application is a continuation of U.S. patent application Ser. No. 12/731,065, entitled "Method and System for Extended Port addressing" filed on Mar. 24, 2010, now U.S. Pat. No. 8,351,448, which claims priority to U.S. Provisional Patent Application Ser. No. 61/162,960, entitled "Method and System for Extended Port addressing" filed on Mar. 24, 2009, the disclosures of which are incorporated herein in their entireties.

TECHNICAL FIELD

The present invention relates to switches used in networks.

BACKGROUND

Virtual machines and virtual ports are commonly used in the storage/networking environment. The increasing use of virtual machine partitions within servers demand an increase in the number of available virtual port identifiers (N_Port IDs (NPIVs)) on a switch port. Typical NPIV implementation has a limit of 127 or 255 virtual addresses per physical port. This limitation is undesirable because virtual machines may demand more virtual ports. Continuous efforts are being made to increase the number of ports.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment a system is provided. The system includes an initiator operationally coupled to a first switch. The first switch includes a plurality of ports for sending and receiving frames and includes a routing table that identifies a port identifier steering table based on an area field of a frame header of a frame received by the first switch. The first switch also includes a plurality of port identifier tables, where each port identifier table is associated with a unique area field and identifies a same port of the first switch for a plurality of area fields.

The system further includes a second switch having a plurality of ports and operationally coupled to a target device and to the first switch. The second switch stores an area steering table with port identification information associated with an area field of a frame header of a frame received by the second switch and a same port is assigned to multiple area fields. The first switch obtains a plurality of identifier values from the second switch and the plurality of identifier values are assigned to a plurality of adapters for the initiator.

In another embodiment, a switch is provided. The switch includes a plurality of ports for sending and receiving frames. The switch further includes a plurality of port identifier tables, where each port identifier table is associated with a unique area field of a frame header of a frame received by the switch and identifies a same port for a plurality of unique area fields. The switch also includes a routing table that identifies a port identifier steering table based on the unique area field in the frame header. The switch obtains a plurality of identifier values and the plurality of identifier values are assigned to a plurality of adapters for an initiator.

In yet another embodiment, a switch is provided. The switch includes a plurality of ports for sending and receiving frames, where a same port from among the plurality of ports is assigned to a plurality of area fields, an area field being associated with a frame received by the switch. The switch includes an area steering table with port identification information associated with an area field and when the frame is received by a port of the switch, an area field is extracted by the port and a matching port identifier is obtained from the area steering table to route the frame.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1A:
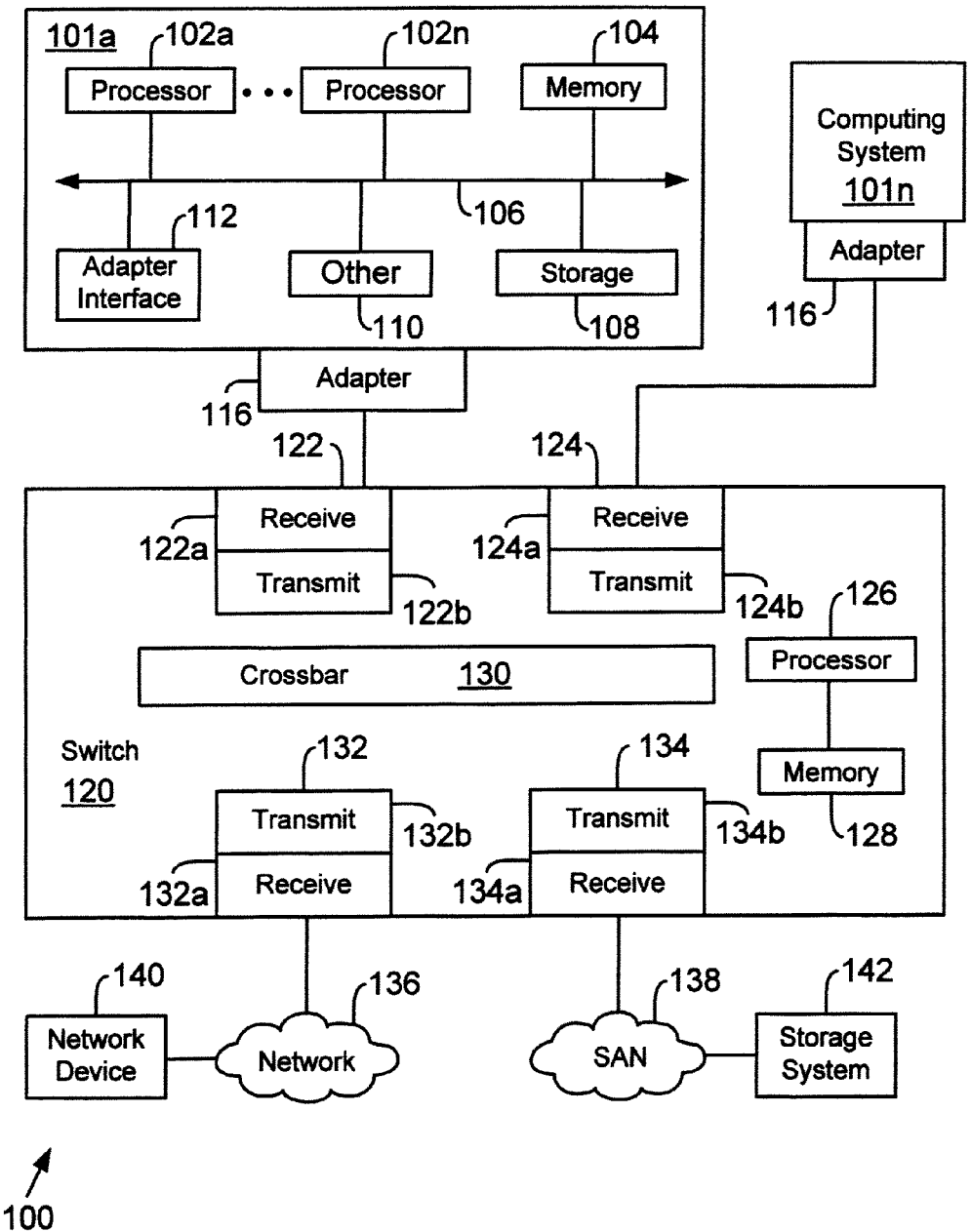
FIG. 1A is a block diagram of a system used according to one embodiment.

The following detailed description describes the present embodiments with reference to the drawings. In the drawings, reference numbers label elements of the present embodiments. These reference numbers are reproduced below in connection with the discussion of the corresponding drawing features.

The following definitions are provided as they are typically (but not exclusively) used in the networking and storage environment, implementing the various adaptive aspects of the present invention.

"Area" means a field within a frame header that identifies the Area of a switch.

"CNA" means a Converged Network Adapter; a device used by a server to access storage in a storage area network. A CNA can support both network (for example, Ethernet traffic) traffic and storage traffic (for example, Fibre Channel traffic).

"D_ID" means a value that identifies a destination in a frame header.

"Domain" means a field within a Fibre Channel frame header that identifies a Fabric Switch.

"Fabric Switch" means a switch that is coupled to other ports. In one embodiment, a Fabric Switch may be an FC or FCoE compliant switch.

"FC" means Fibre Channel.

"FCID" (or FC_ID") means a header used in a Fibre Channel environment. The header may be a 24-bit address and include values identifying a frame's Domain, Area and Port ID (Port Identifier).

"FCoE" means Fibre Channel over Ethernet; a recent protocol transport method for encapsulating FC frames within an Ethernet packet.

"HBA" means a Host Bus Adapter, a device used by a server to access storage in a storage area network.

"NPIV" (or "NP_IV") means N_Port ID Virtualization that allows one to assign various identifiers to a physical port in an environment that uses Fibre Channel. The NP_IV identifiers create a plurality of virtual ports for the physical port.

"Port ID" (PID) means an identifier that uniquely identifies a port. An NPV_ID identifies a unique virtual port.

"OX_ID" means an Originating Exchange Identifier, a field in a FC header that, in conjunction with the S_ID and D_ID defines data frames associated with a specific SCSI command.

"S_ID" means a value that identifies a source of a frame.

"Transparent Switch" means a special purpose FC device that proxies connection from HBAs (or CNAs) to a Fabric Switch. An example of which is provided in U.S. Pat. No. 7,340,167.

"Uplink Port" means a port on a Switch that connects to a Fabric Switch.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

Network/Storage System:

FIG. 1A is a block diagram of a system 100 including a plurality of computing systems 101a-101n (may also be referred to as "host system 101") each having an adapter 116 operationally coupled to a switch 120. There may be other systems/components that may be placed between the aforementioned components but they are not germane to the embodiments disclosed herein.

Host system 101 may include one or more processors 102a-102n (jointly referred to as processor 102), also known as a central processing unit (CPU), interfacing with other components via a bus 106. Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind.

The host system 101 may also include a storage device 108, which may be for example a hard disk, a CD-ROM, a non-volatile memory device (flash or memory stick) or any other device. Storage 108 may store processor executable instructions and data, for example, operating system program files, application program files, and other files. Some of these files are stored on storage 108 using an installation program. For example, the processor 102 may execute computer-executable process steps of an installation program so that the processor 102 can properly execute the application program.

Host system 101 interfaces with a memory 104 that may include random access main memory (RAM), and/or read only memory (ROM). When executing stored computer-executable process steps from storage 108, the processor 102 may store and execute the process steps out of memory 104.

The host system 101 may also include other devices and interfaces 110, which may include a display device interface, a keyboard interface, a pointing device interface and others.

Host system 101 may also include an adapter interface 112 that allows the host system to interface with an adapter 116. The link between adapter 116 and adapter interface 112 may be a peripheral bus, for example, a PCI, PCI-X or PCI-Express link.

Adapter 116 may be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 116 shown in FIG. 1A may be configured to operate as a FCOE adapter. QLogic Corporation, the assignee of the present application, provides one such adapter. Those of ordinary skill in the art will appreciate, however, that the present embodiments are not limited to any particular protocol.

Adapter 116 facilitates communication between host 101 and network device 140 via switch 120 and network 136. Adapter 116 also facilitates communication between a storage system 142 via switch 120 and a storage area network 138.

Switch 120 includes a plurality of ports 122, 124, 132 and 134. Ports 122 and 124 are coupled to adapters 116. Port 132 is operationally coupled to a network 136 providing access to a network device 140. Port 134 is operationally coupled to SAN 138 and provides access to storage system 142.

Each of the plurality of ports include logic and structure to process incoming network and storage related traffic and then transmits them to their destination. For example, each port includes a receive segment to receive and process a network packet or frame. Each port also includes a transmit segment that transmits a packet to another port. The receive segment and transmit segment for each port is shown as 122a/122b, 124a/124b, 132a/132b and 134a/134b. The ports may communicate with each via a crossbar 130.

Switch 120 includes a processor 126 that has access to memory 128. Memory 128 may be used to store configuration information that is used for controlling switch 120 operations.

Figure 1B:
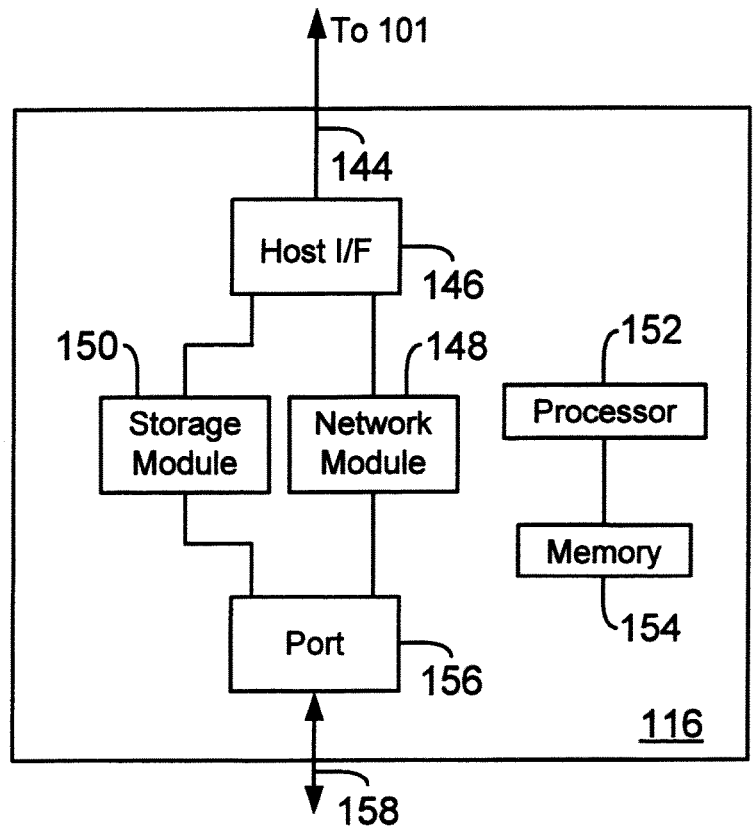
FIG. 1B shows a block diagram of a converged adapter.

Before describing details regarding of the various embodiments, the following provides a brief description of adapter 116. As shown in FIG. 1B, Adapter 116 may include a host interface 146, network module 148, storage module 150, adapter processor 152 and memory 154. The host interface 146 is configured to interface with host system 101, via bus 144. As an example, bus 144 may be a PCI, PCI-X, PCI-Express or any other type of interconnect.

Memory 154 may be used to store programmable instructions, for example, firmware. The adapter processor 152 executes firmware stored in the memory 154 to control overall functionality of adapter 116 and also interface with host 101 and other devices.

Network module 148 is used to process network packets, while storage module 150 is used to process storage traffic. Port 156 interfaces with other devices, for example, switch 120, via bus 158.

Figure 2:
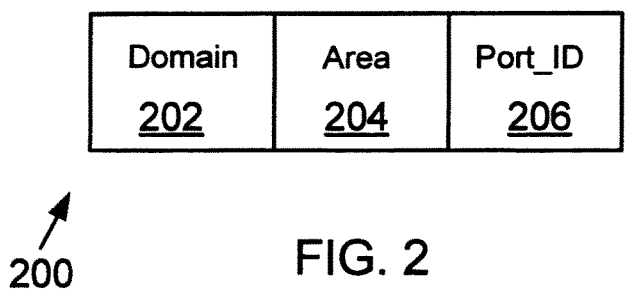
FIG. 2 shows a block diagram of a Fibre Channel header, used according to one embodiment.

Fibre Channel Addressing:

Fibre Channel addressing may be used for handling storage related traffic between host 101 and storage system 142. The following describes the standard Fibre Channel addressing scheme 200, as shown in FIG. 2. The address identifier 200 includes a domain identifier 202 (Domain_ID 202), an Area identifier 204 (Area$_{13}$ ID 204) and a port identifier 206 (Port_ID 206).

The Domain_ID 202 comprises the upper 8 bits of a 24-bit Fibre Channel frame address. A Domain includes one or more Fibre Channel switches that have the same Domain_ID for all N_Ports and NL_Ports within or attached to switches. If there is more than one switch in the Domain, then each switch within the Domain is directly connected via an Inter-Switch Link (ISL) to at least one other switch in the same Domain.

The Area_ID 204 comprises the middle 8 bits of a 24-bit Fibre Channel address. The Area_ID 204 applies either to (a) one or more N_Ports within and attached to a Fibre Channel switch; or (b) an Arbitrated Loop of NL_Ports attached to a single FL_Port.

The Port_ID 206 comprises the lower 8 bits of a 24-bit Fibre Channel address. The Port_ID 206 applies to either (a) a single N_Port or virtualized N_Port within a Domain/Area or (b) the valid arbitrated loop physical address (AL_PA) of a single NL_Port or FL_Port on an Arbitrated Loop.

Figure 3:
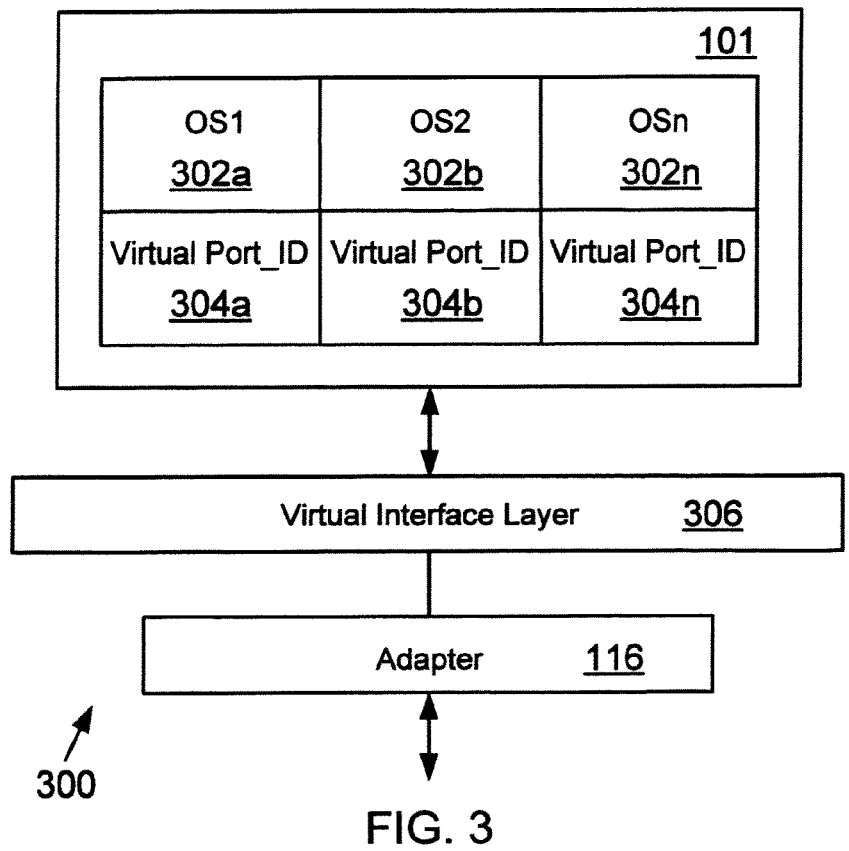
FIG. 3 shows an example of a virtual environment that can use the adaptive embodiment disclosed herein.

Virtual Environment:

FIG. 3 shows an example of a virtual environment 300 that may be used to access storage system. System 300 may include a plurality of operating systems (OS1, OS2, ... OSN) 302a-302n (also referred to as OS) that are executed by computing system 101. The operating systems in this case may be of different types. For example, OS1 302a may be a Windows based system, OS2 302b may be a Linux based operating system, OS3 302n may be a Solaris based operating system and so on. The different operating systems are images that are executed in a virtual machine environment. One such environment/product is provided by VMWare Inc. and Microsoft Corp.

The operating systems 302a-302n communicate with other devices, including adapter 116, via a virtual interface layer 306. An example, of one such layer is the Hypervisor layer that is provided by VMWare Inc. or the Hyper-V layer provided by Microsoft Corp.

Each operating system is given access to hardware resources, for example, adapter 116. An adapter or adapter port may be identified by using unique identifiers. One such identifier is called NPIV (i.e., N_Port virtual ID virtualization), used in the Fibre Channel environment. By using NPIV, a single physical port (for example, 156, FIG. 1B) may be assigned multiple unique identifier values (for example, 304a-304n). This allows one physical port to be shared among multiple systems or operating systems, as shown in FIG. 3.

In a typical implementation, one can only use 255 virtual addresses per physical port. This is an undesirable limitation because multiple virtual machines can need more than 255 virtual port addresses. The embodiments described herein provide a scheme by which port addressing can be extended beyond a certain number, for example, 255, by using an extended addressing scheme, described below in detail.

Figure 4C:
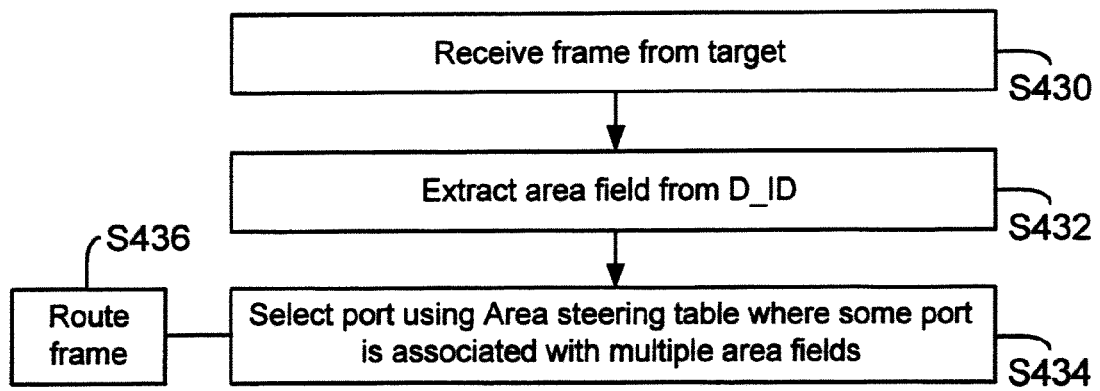
FIGS. 4A-4L show various examples for routing frames, according to various embodiments of the present disclosure.
Figure 4A:
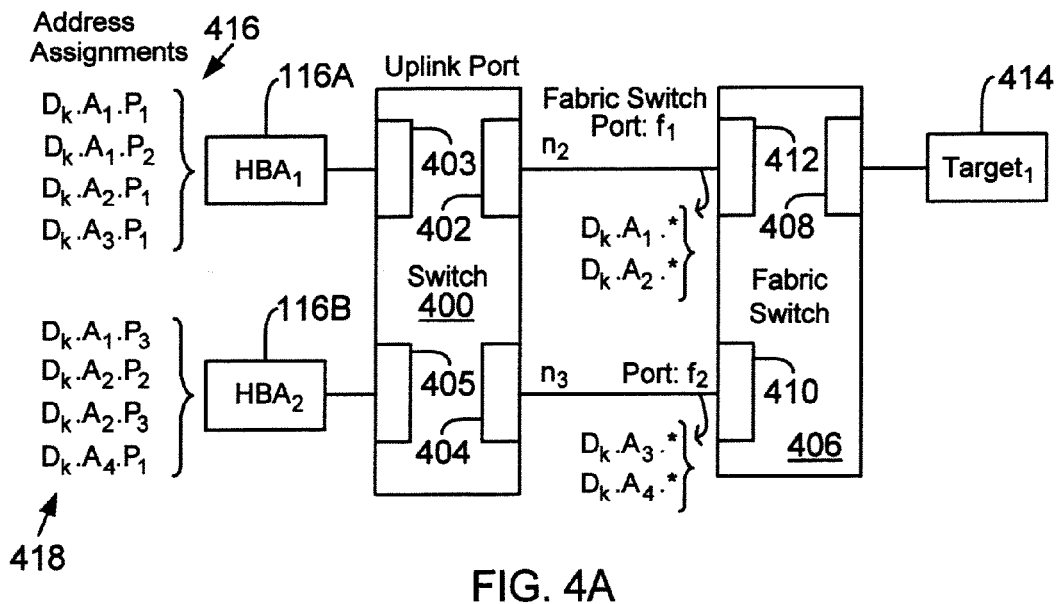

Extended Port Addressing:

FIG. 4A shows an example for implementing extended port addressing between a Fabric Switch 406 (similar to switch 120) and a Switch 400 that is operationally coupled to HBAs 116A and 116B via ports 403 and 405, respectively. As an example, switch 400 may be a transparent switch described in U.S. Pat. No. 7,340,167. Fabric switch 406 is coupled to target 414.

Fabric switch 406 includes port $f_1$ 412 that operates as an F_Port for servicing a corresponding uplink port $n_2$ 402 of the switch 400. Port $f_2$ 410 of Fabric Switch 406 interfaces with Port $n_3$ 404 of Switch 400.

Fabric Switch 406 may be assigned to a Domain, $D_k$. Port $f_1$ 412 may be allocated two separate address ranges, for example, $D_k.A_1.*$ and $D_k.A_2.*$, where "*" represents a range of Port identifier (Port ID) values from 0 ... 255. Port $f_2$ 410 may also be allocated two separate address ranges, for example, $D_k.A_3.*$ and $D_k.A_4.*$, where "*" represents a range of Port ID values from 0 ... 255. The address range and domain values may be assigned by an administrator using a computing system, similar to 101, as shown in FIG. 1A.

Switch 400 includes port $n_2$ 402 and port $n_3$ 404 that can operate as N_Ports. Port $n_2$ 402 and port $n_3$ 404 obtain FCIDs, by initiating a discovery request, for example, the Fibre Channel standard "FDISC" request to port $f_1$ 412 and port $f_2$ 410. The obtained FCIDs are then assigned to HBAs 116A and 116B that are coupled to ports 403 and 405, respectively. The FCIDs assigned to the HBAs 116A and 116B are shown as 416 and 418, respectively.

Fabric Switch 406 associates a plurality of Fibre Channel Area fields into a pool for allocating NPIV identifiers in response to discovery requests from Switch 400. Switch 400 supports a plurality of NPIV connections per HBA (116A and 116B). Switch 400 is able to direct data flow between HBA 116A and 116B and switch 400 ports based on an FCID associated with the HBAs as described below in more detail.

Figure 4B:
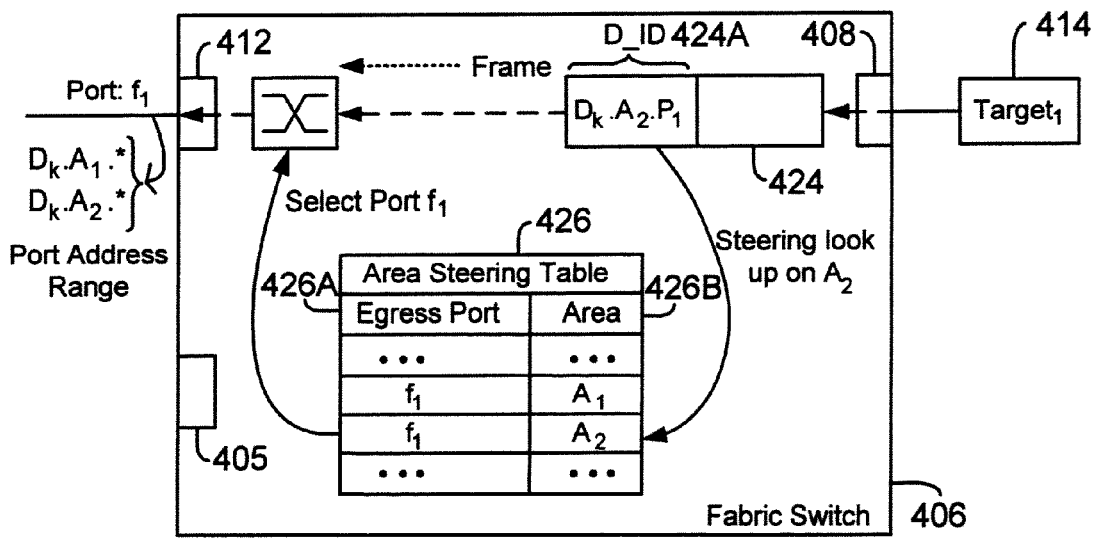

FIG. 4B shows an example of routing data from Target$_1$ 414 through Fabric Switch 406 to an egress port f$_1$ 412 for delivery to switch 400 and then eventually to HBA 116A. Fabric switch 406 stores an Area Steering Table 426 for routing frames. Area steering table includes column 426A and 426B. Column 426A stores identifier values for an egress port, i.e., a port from where a frame is transmitted. Column 426B stores area identifier values that can be compared to an area field in a frame's D_ID. To support a plurality of areas for a given egress port, each related area field can be associated with the same egress port, i.e., the ports may be referenced by more than one area field.

When a frame 424 is received from target 414, port 408 extracts the D_ID 424A of the frame 424. In the example of FIG. 4B, the frame's D_ID Area field value is A$_2$. The extracted area field is used to index the Area Steering Table 426 to select an egress port, for example, f$_1$ 412.

Port f$_1$ 412 can be configured to accept more than one address range, for example, $D_k.A_1.*$ and $D_k.A_2.*$, for both transmission and reception of data. As an example in FIG. 4B, both area field entries A$_1$ and A$_2$ have corresponding entries for port f$_1$ 412. This allows one to use the same port for multiple area entries thereby enabling extended port addressing on port f$_1$ 412.

FIG. 4C shows a process for using Area Steering Table 426 that stores multiple area field entries for the same port for supporting extended port addressing. The process begins in block S430, when a frame is received at port 408. The D_ID field 424A is extracted in block S432 and the area field (A$_2$) from the D_ID is used to find a corresponding port from Area Steering Table 426 in step S434. As described above, Area Steering Table 426 may store multiple entries for the same port corresponding to different area fields for the same domain. Thereafter, in block S436, the frame is routed from the selected egress port.

Figure 4D:
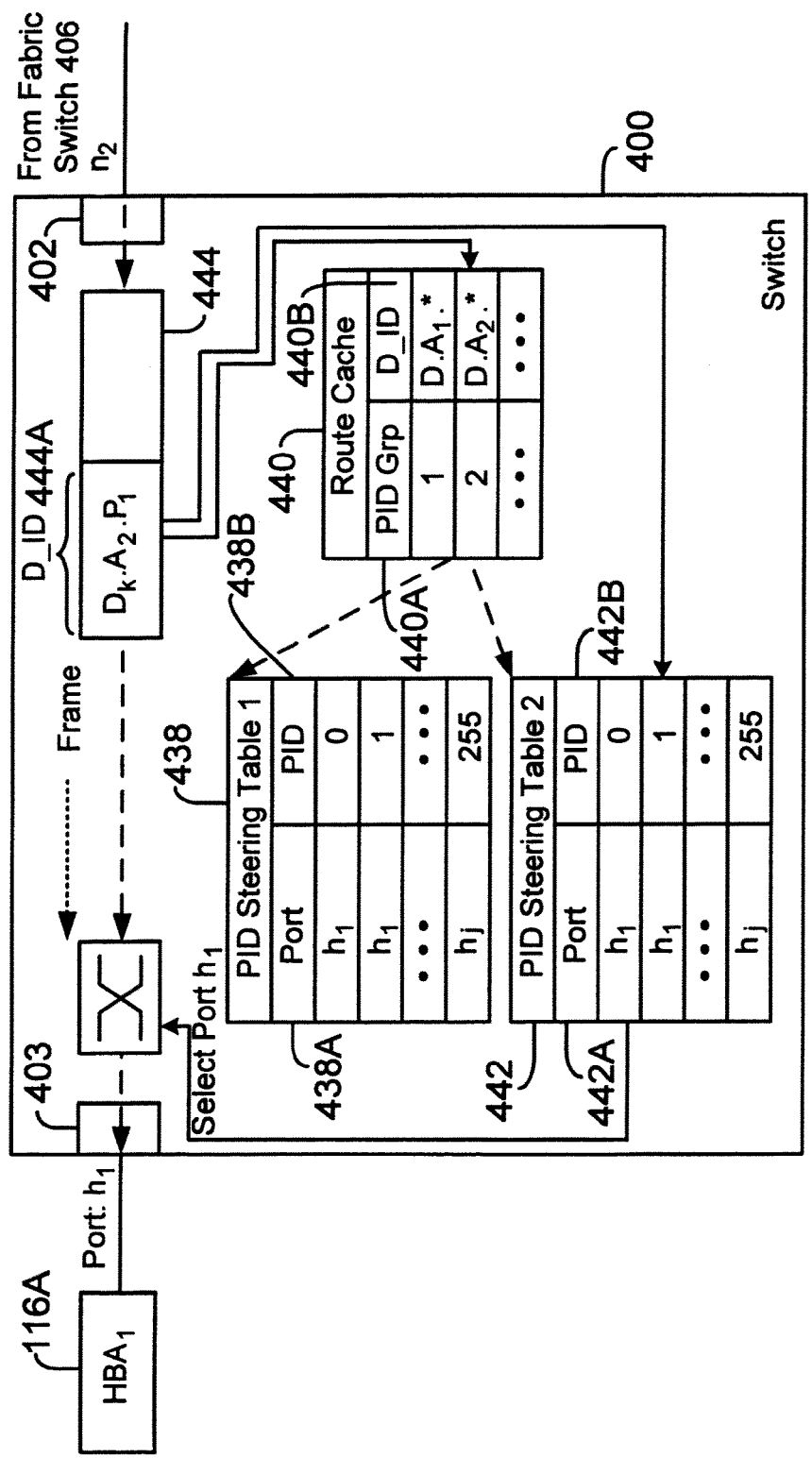

FIG. 4D shows an example of routing frames via switch 400, according to one embodiment. Switch 400 stores a route cache table 440 and a plurality of Port_ID (PID) routing tables 438 and 442. The route cache table 440 can include two columns 440A and 440B. Column 440A identifies a PID group associated with a D_ID stored in column 440B. It is noteworthy that table 440 may also store S_ID values to select the PID group.

PID steering table 438 includes column 438A and 438B. Column 438A includes a port identifier that corresponds to a PID in column 438B. PID steering table 442 with columns 442A and 442B is similar to table 438 with columns 438A and 438B. The plurality of PID tables, for example, one for each unique D_ID area field, enables the use of multiple Area fields to extend standard NPIV address range.

In the example of FIG. 4D, a frame 444 is received from Fabric Switch 406 at port 402. The frame's D_ID is 444A and is extracted by port 402. Using the area field in D_ID 444A, a PID group table is selected. In this example, for Area field A2, Table 442 is selected. PID table 442 then identifies port h$_1$ 403 for sending the frame to HBA 116A.

Because there is a routing table for each unique area field, one is able to route frames using more than the typical 255 NPIVs that are available to switch vendors.

Figure 4E:
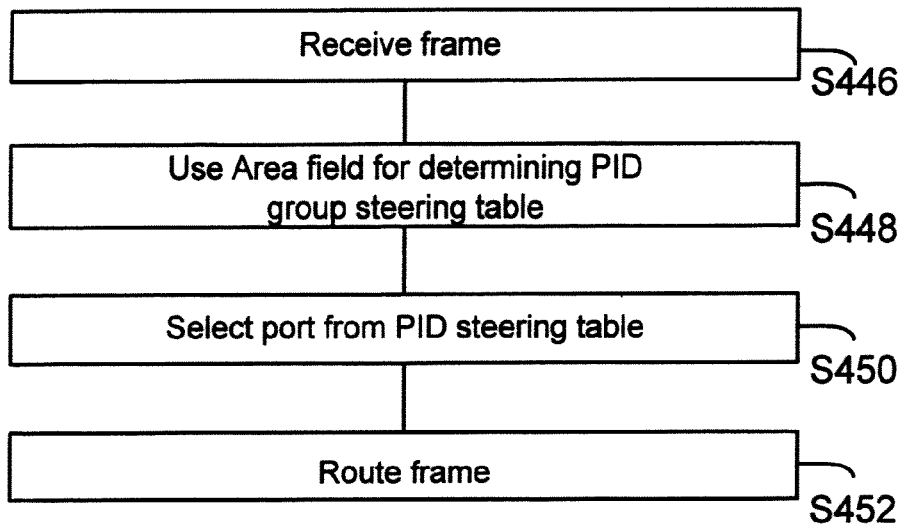

FIG. 4E shows a process flow diagram for routing a frame using switch 400, according to one embodiment. The process begins in S446 when a frame 444 is received. The D_ID 444A is extracted. In block S448, the area field from D_ID 444A is used to identify a PID steering table from route cache 440. Thereafter, in block S450, a port is identified from the identified PID steering table and the frame is routed from the identified port in block S452.

Figure 4G:
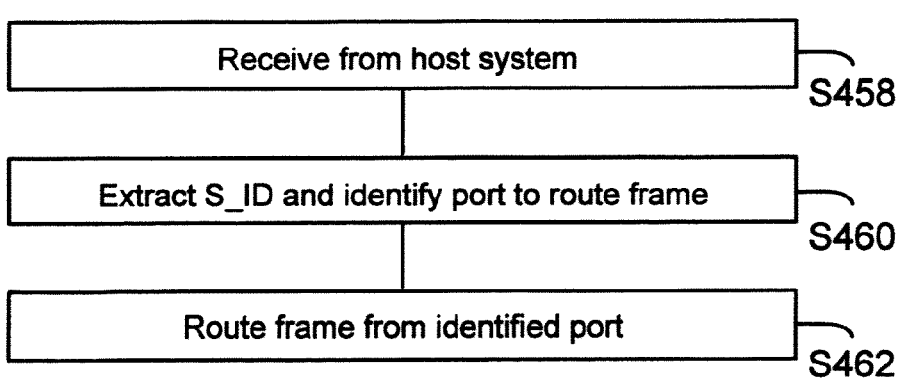
Figure 4J:
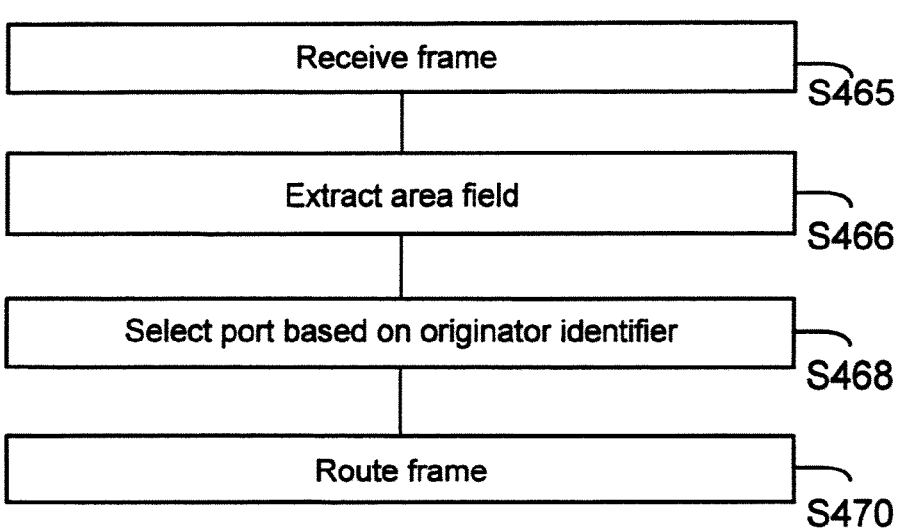
Figure 4F:
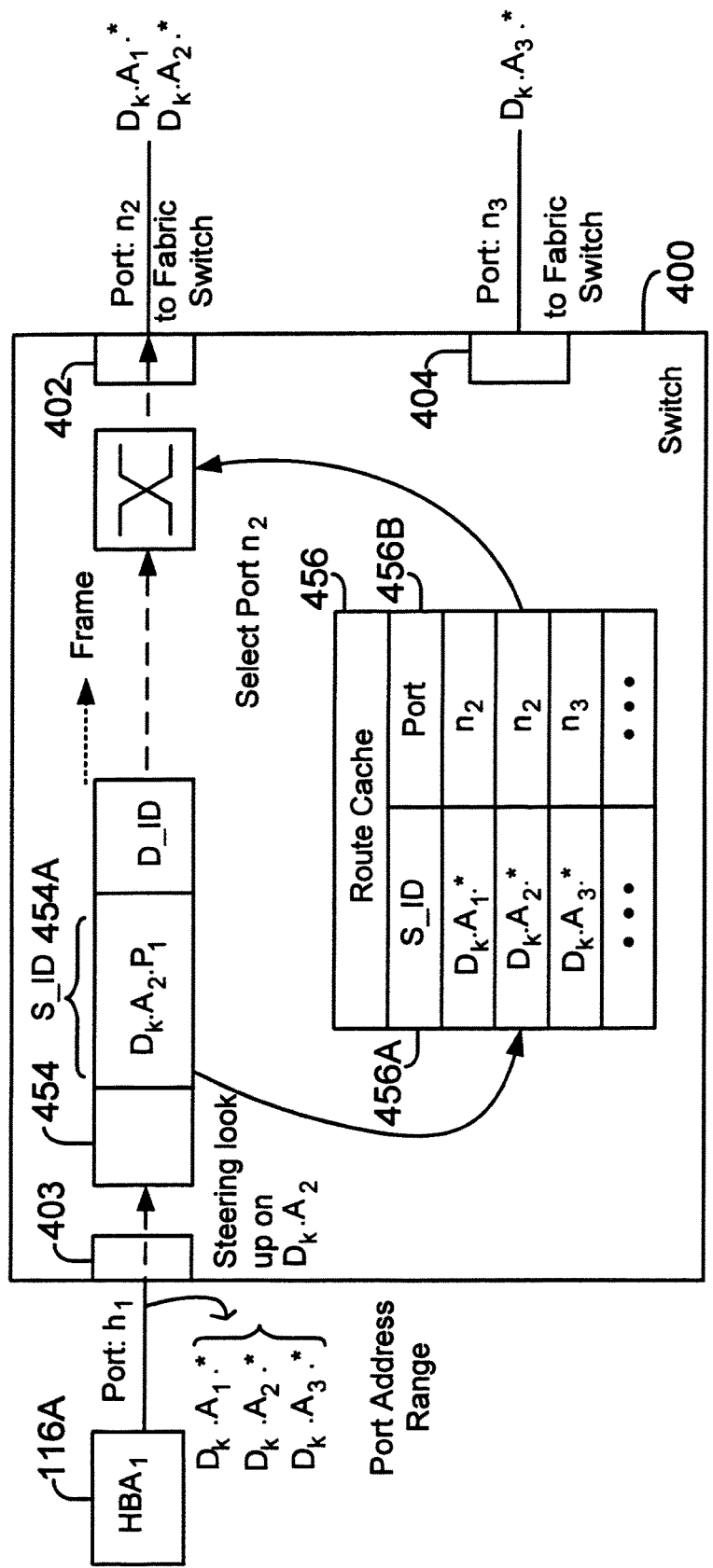

FIG. 4F shows how a frame received from HBA 116A is routed by switch 400 using route cache 456 with columns 456A and 456B for switch 400. Column 456A stores domain and area values $D_k A_1 \ldots D_k A_n$ and column 456B stores port identifiers corresponding to domain and area entries in column 456A.

It is noteworthy that a same port may be identified for different domain/area fields, i.e., $D_k A_1$ and $D_k A_2$ can both include entries identifying the same port 402. This supports extended port routing. In the example of FIG. 4F, a frame 454 is received at port 403. The S_ID 454A is extracted and then column 456A is used to provide a port identifier. The identified port is then used to route frame 454.

FIG. 4G shows a process flow diagram for routing frame 454, according to one embodiment. The process starts in block S458 when the frame is received at port 403. In block S460, the frame's S_ID (454A) is extracted. The domain/area field in column 456A of route cache 456 is then used to identify a port and the frame is then routed from the identified port in block S462.

Figure 4H:
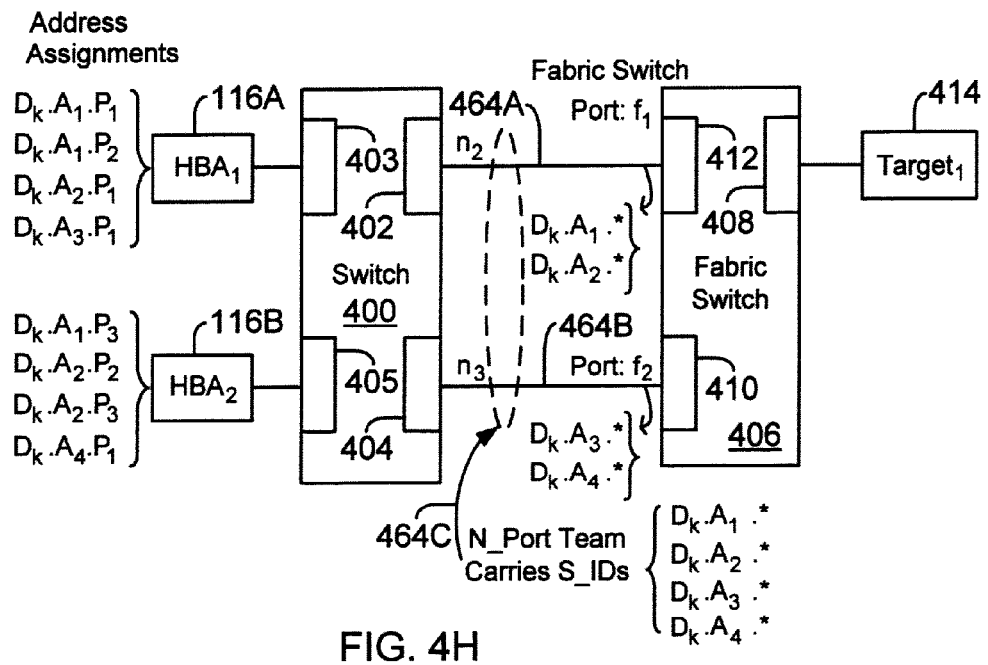

The embodiments described herein for extending port addressing by assigning different area fields to the same port can also be used to balance traffic of a switch link. When traffic is split among links, it is referred to as "load balancing". FIG. 4H shows an example of load balancing network where traffic between HBA 116A and target 414 may be split among links 464A and 464B, according to one embodiment. In this example, port f$_1$ 412 may carry traffic for the entire set of HBA NPIV values that were assigned to f$_1$ 412 (e.g., $D_k.A_1.*$ and $D_k.A_2.*$) and port f$_2$ 410 (e.g., $D_k.A_3.*$ and $D_k.A_4.*$). The same set may also be carried on port f$_2$ 410. This concept is referred to herein as N_Port teaming or aggregation. The grouped addresses for N_Port teaming are shown as 464C and described below.

Figure 4I:
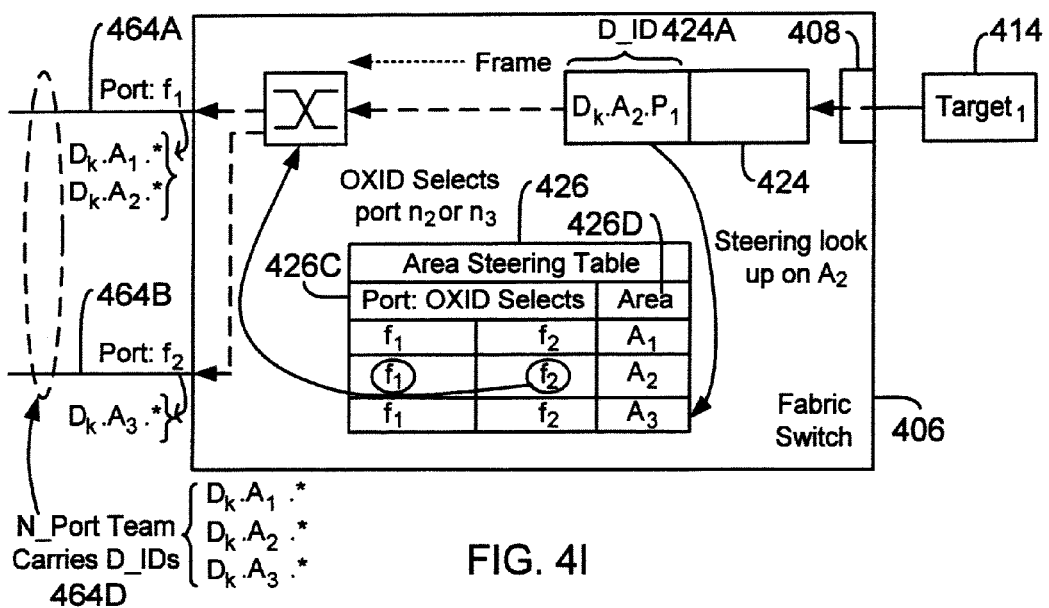

FIG. 4I shows a block diagram for routing frame 424 received from target 414 using load balancing, according to one embodiment. Port 408 extracts the D_ID 424A. The Area field A$_2$ is used to index into Area Steering Table 426. Area Steering table 426 includes column 426C where each port 403 and 405 is referenced for each address range $D_k.A_1.*$, $D_k.A_2.*$ and $D_k.A_3.*$. The OX_ID or hashed OX_ID value may be used to select a particular port from column 426C. Area Steering table 426 includes column 426D for storing area fields.

The use of multiple area fields referencing the same egress port supports extended area addressing and the OX_ID based selection supports using the N-Ports as a team (464D) and load sharing among the ports.

FIG. 4J shows a process flow diagram for using OX_ID at Fabric Switch 406, according to one embodiment. The process starts in block S465 when frame 424 is received. The area field is extracted in block S466. Then based on the OX_ID, a port is selected in block S468 from column 426C of the Area Steering Table 426 and the frame is routed in block S470.

Figure 4K:
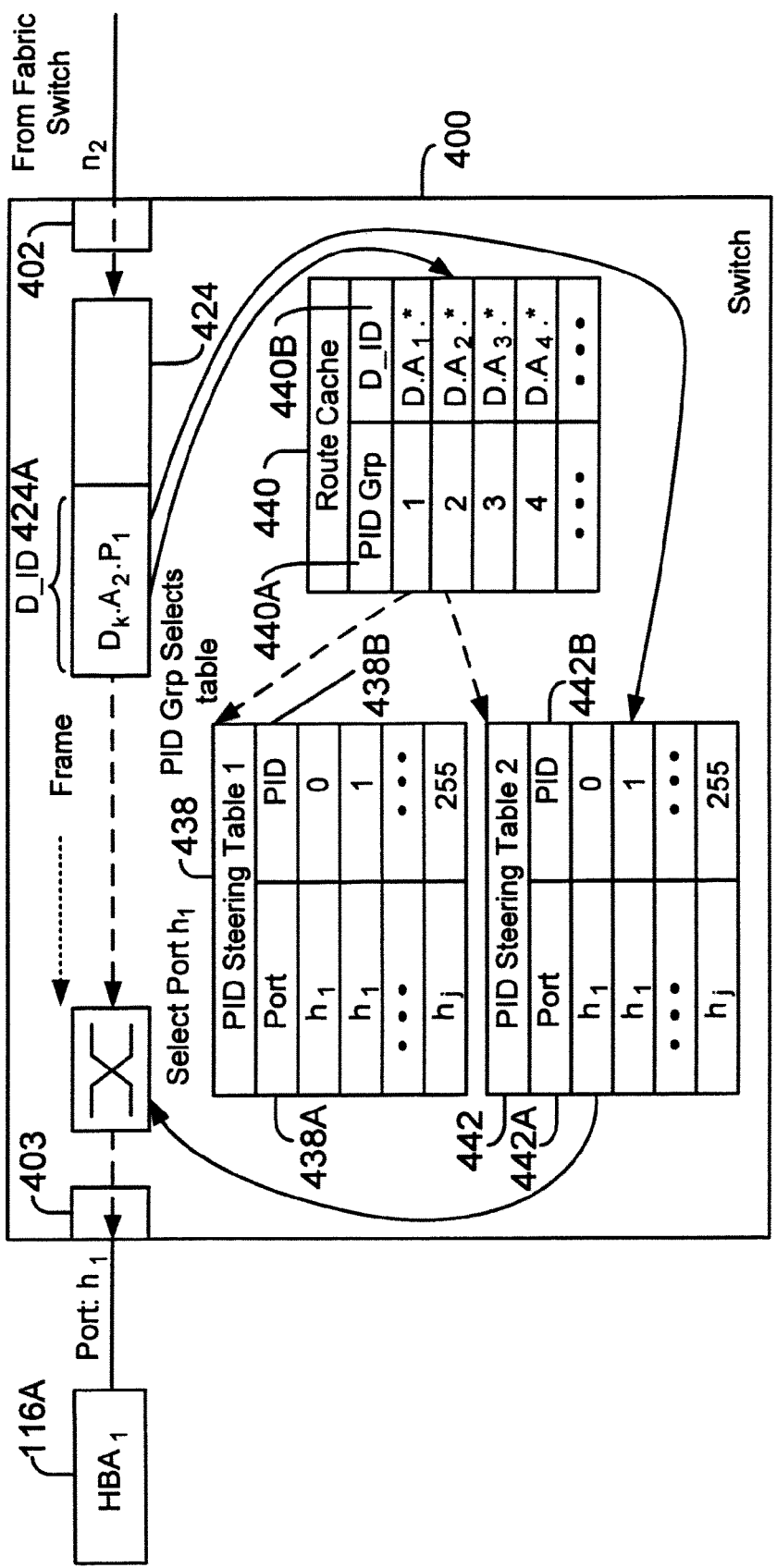

FIG. 4K is similar to FIG. 4D, except in FIG. 4K, switch 400 can handle FCID addresses for a plurality of N_Ports described above. Frame 424 is received from Fabric switch 406. The D_ID 424A is used to determine the PID group from route cache 440. Thereafter, PID steering tables 438 and 442 are used to determine a port identifier to route the frame to HBA 116.

The use of multiple steering tables, one for each unique D_ID area field enables the use of area fields to extend NPIV address range. The inclusion of all the entries for all the FCIDs associated with all the N_Ports enables N_Port teaming for load sharing.

Figure 4L:
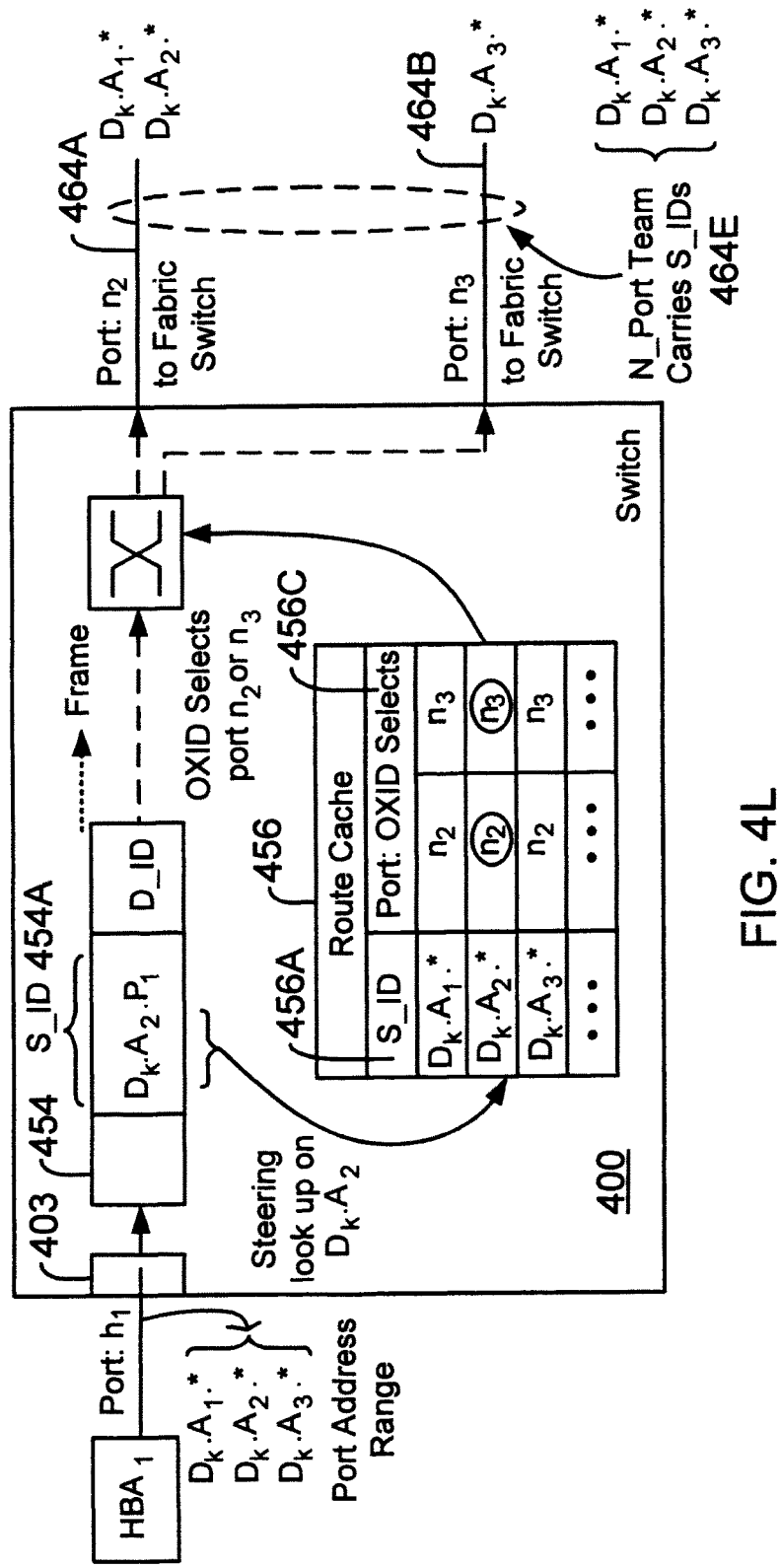

FIG. 4L shows the use of OX_ID for selecting a port using route cache 456, according to one embodiment. Route cache 456 stores the S_ID for each port in column 456A and the port identifiers based on OX_ID are provided in column 456C.

When frame 454 is received by port 403, the S_ID 454A is extracted. Using the domain and area field of the S_ID, a corresponding port is selected from column 456C. The use of OX_ID allows N_Ports 402 and 404 to share links 464A and 464B.

In the example of FIG. 4L, the Domain and Area field values of S_ID 454A (shown as $D_k.A_2$) may be matched with the Route Cache 456 column 456A to select the egress port n2 402 or port n3 404 based on a hash value of the OX_ID. It is noteworthy that $D_k.A_1$, $D_k.A_2$ and $D_k.A_3$ may all have the same port steering entries in the Route Cache 456 to steer frame 454 to port $n_2$ 402 and port $n_3$ 404 thereby supporting both extended port addressing and port teaming shown as 464E.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A method for routing frames in a network, the method comprising:
   receiving a frame at a port of a network device;
   extracting a destination field from the frame;
   using an area field from the extracted destination field as an index into an area steering data structure;
   identifying, using the area steering data structure, an egress port of the network device corresponding to the extracted destination field through which to route the frame; and
   routing the frame through the identified egress port;
   wherein the area steering data structure stores multiple entries for a same egress port corresponding to different area fields of a same domain.

2. The method of claim 1, wherein the network device is a switch.

3. The method of claim 1, wherein the network device stores the area steering data structure.

4. The method of claim 1, wherein the network device is a Fibre Channel device.

5. The method of claim 4, wherein the extracted destination field is a D_ID field.

6. A method for routing frames in a network, the method comprising:
   receiving a frame at a port of a network device;
   extracting a destination field from the frame;
   using an area field from the extracted destination field to identify a port steering data structure from a route cache data structure;
   using the identified port steering data structure to identify an egress port of the network device through which to route the frame; and
   routing the frame through the identified egress port;
   wherein the port steering data structure stores multiple entries for a same egress port corresponding to different area fields of a same domain.

7. The method of claim 6, wherein the network device is a switch.

8. The method of claim 6, wherein the network device stores the port steering data structure.

9. The method of claim 6, wherein the network device is a Fibre Channel device.

10. The method of claim 9, wherein the extracted destination field is a D_ID field.

11. A method for routing frames in a network, the method comprising:
    receiving a frame at a port of a network device;
    extracting a source field from the frame;
    using a domain field and an area field from the extracted source field as an index into a route cache data structure;
    identifying, using the route cache data structure, an egress port of the network device corresponding to the extracted source field through which to route the frame; and
    routing the frame through the identified egress port;
    wherein the route cache data structure stores multiple entries for a same egress port corresponding to different area fields of a same domain.

12. The method of claim 11, wherein the network device is a switch.

13. The method of claim 11, wherein the network device stores the route cache data structure.

14. The method of claim 11, wherein the network device is a Fibre Channel device.

15. The method of claim 14, wherein the extracted destination field is a D_ID field.

* * * * *

UNITED STATES PATENT AND TRADEMARK OFFICE
CERTIFICATE OF CORRECTION

PATENT NO.        : 9,071,558 B1                                                Page 1 of 1
APPLICATION NO.   : 13/711380
DATED             : June 30, 2015
INVENTOR(S)       : Edward C. McGlaughlin It is certified that error appears in the above-identified patent and that said Letters Patent is hereby corrected as shown below:

In the Specification

In column 5, line 52, delete "(Area$_{13}$ ID" and insert -- (Area_ID --, therefor.

In column 8, line 54, delete "egrees" and insert -- egress --, therefor.

In column 9, line 20, delete "n2" and insert -- $n_2$ --, therefor.

In column 9, line 21, delete "n3" and insert -- $n_3$ --, therefor.

Signed and Sealed this
Twenty-second Day of March, 2016

Michelle K. Lee
*Director of the United States Patent and Trademark Office*